United States Patent
Carter et al.

Patent Number: 6,151,909
Date of Patent: Nov. 28, 2000

[54] TWO SPOOL AIR CYCLE MACHINE HAVING CONCENTRIC SHAFTS

[75] Inventors: Michael E. Carter, Torrance, Calif.; Ronald E. Crabtree, Sun Lakes, Ariz.; Terrence P. Emerson, Hermosa Beach, Calif.; Arturo Moreno, Long Beach, Calif.; Terry Morris, Garden Grove, Calif.; Raymond Rapozo, Anaheim, Calif.; Marshall Saville, Torrance, Calif.

[73] Assignee: AlliedSignal Inc., Morristown, N.J.

[21] Appl. No.: 09/263,052

[22] Filed: Mar. 6, 1999

Related U.S. Application Data

[60] Provisional application No. 60/077,914, Mar. 13, 1998.

[51] Int. Cl.$^7$ ........................................................ F25D 9/00
[52] U.S. Cl. ................................................................ 62/402
[58] Field of Search ............................... 62/401, 402, 86, 62/87

[56] References Cited

U.S. PATENT DOCUMENTS

| 3,877,246 | 4/1975 | Schutze . |
| 5,309,735 | 5/1994 | Maher, Jr. et al. . |

FOREIGN PATENT DOCUMENTS

| 768975 | 5/1955 | United Kingdom . |

*Primary Examiner*—William Doerrler
*Assistant Examiner*—Malik N. Drake
*Attorney, Agent, or Firm*—William J. Zak, Jr., Esq.

[57] ABSTRACT

A two-spool air cycle machine includes a high pressure cooling turbine section; a low pressure cooling turbine section; and first and second shafts that are concentrically arranged and that are independently rotatable with respect to one another. A turbine wheel of the high pressure turbine section is secured to the first shaft, and a turbine wheel of the second turbine section is secured to the second shaft. Such an air cycle machine may be used a variety of different aircraft environmental control systems.

13 Claims, 1 Drawing Sheet

TWO SPOOL AIR CYCLE MACHINE HAVING CONCENTRIC SHAFTS

This application claims the benefit of provisional application Ser. No. 60/077,914 filed on Mar. 13, 1998.

BACKGROUND OF THE INVENTION

The invention relates to environmental control systems. More specifically, the invention relates to a two-spool air cycle machine for an aircraft environmental control system.

Most aircraft air environmental control systems operate on an air cycle refrigeration principle. Compressed air is obtained from a compressor section of the aircraft's main engine, cooled with ambient air to near-ambient temperature in an air-to-air heat exchanger and then expanded in an air cycle machine to provide a stream of cooled, conditioned air. The conditioned air is supplied to the passenger cabin. Although somewhat expanded, the conditioned air also pressurizes the cabin.

The air cycle machine typically includes one or two cooling turbine sections for expanding the air. Cascading two cooling turbine sections generally results in a more efficient thermodynamic cycle and allows the air to be cooled to subfreezing temperatures. Less subfreezing air is used to cool the aircraft cabin. Consequently, the size of the air-to-air heat exchanger can be reduced.

The two turbine sections may be arranged in separate spools. However, packaging the two spools can present problems. Ducting between the two spools, heat exchangers and water separation equipment can become complex.

U.S. Pat. No. 5,309,735 discloses an air cycle machine having two turbine wheels, a compressor wheel and a fan rotor that are secured to a single shaft. Resulting is a "four wheel" air cycle machine. The two turbines may be cascaded.

However, there are also certain problems associated with this four wheel air cycle machines. The fan and compressor are forced to operate at the same speed. However, the fan usually operates more efficiently at lower speeds, whereas the compressor usually operates more efficiently at higher speeds. Thus, mounting all four components on a single shaft sacrifices system performance and adds to the energy input requirements.

SUMMARY OF THE INVENTION

These problems are overcome by an air cycle machine according to the present invention. The air cycle machine includes a first cooling turbine section including a first turbine wheel; a second cooling turbine section including a second turbine wheel; and a first shaft and a second shaft. The first and second shafts are concentrically arranged and independently rotatable with respect to one another. The first turbine wheel is secured to the first shaft and the second turbine wheel is secured to the second shaft. The air cycle machine may be used a variety of different two-spool environmental control systems, whereby a first spool includes the first turbine section and the first shaft, and a second spool includes the second turbine section and the second shaft.

BRIEF DESCRIPTION OF THE DRAWINGS

The FIGURE is an illustration of an air cycle machine according to the present invention.

DETAILED DESCRIPTION OF THE INVENTION

Figure 1:
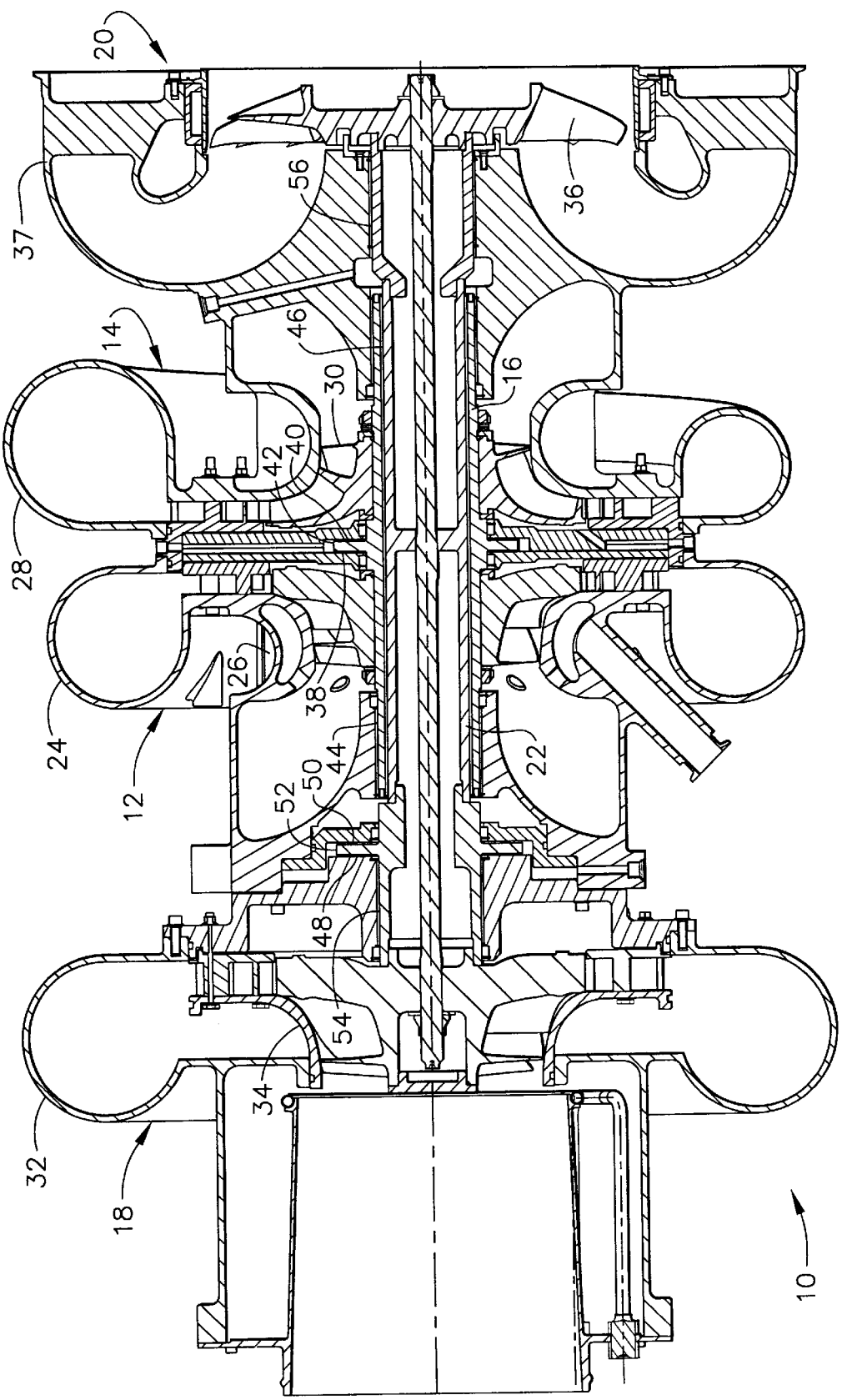

The FIGURE shows a two spool air cycle machine 10. A first spool of the air cycle machine includes a high pressure cooling turbine section 12, a compressor section 14, and a hollow compressor shaft 16. A second spool of the air cycle machine 10 includes a low pressure cooling turbine section 18, a fan section 20 and a fan shaft 22. The fan shaft 22 extends through the hollow of the compressor shaft 16, with its ends extending beyond the ends of the compressor shaft 16. The compressor and fan shafts 16 and 22 are concentrically arranged and are independently rotatable with respect to one another.

The high pressure turbine section 12 includes a housing 24 and a first turbine wheel 26 in a radial inflow configuration. The compressor section 14 includes a housing 28 and a compressor wheel 30 in a radial outflow configuration. The first turbine wheel 26 and the compressor wheel 30 are secured to a central portion of the compressor shaft 22. Such placement of the first turbine wheel 26 and the compressor wheel 30 reduces critical bending.

The low pressure turbine section 18 includes a housing 32 and a second turbine wheel 34 in a radial inflow configuration. The fan section 20 includes a fan rotor 36 and a fan housing 37. The second turbine wheel 34 and the fan rotor 36 are secured near opposite ends of the compressor shaft 16.

Since the compressor and fan shafts 16 and 22 are independently rotatable, they can be rotated at different shaft speeds. Thus, the low pressure cooling turbine section 18 can drive the fan rotor 36 at relatively low speeds, while the high pressure cooling turbine section 12 can drive the compressor section 14 at relatively high speeds. This allows the fan section 20 to be designed more efficiently (e.g., tip diameter of the fan blade 36 can be increased). Very large fans used for propulsion achieve peak efficiencies at relatively slow speeds. They are relatively high-flow, low-pressure-ratio devices as compared to compressors. The compressors reach peak efficiencies at relatively high speeds. Thus, the air cycle machine 10 allows both the compressor section 14 and the fan section 20 to be sized and operated for peak efficiency.

The compressor and fan shafts 16 and 22 may be supported by first and second sets of self-pressurized air bearings such as foil bearings. Foil bearings, which operate with an air film between the shaft and foil surfaces, eliminate the need for a separate bearing lubrication system and reduce the occurrence of maintenance servicing.

The first set of bearings includes first and second thrust bearings 38 and 40. A first thrust plate 42 extends radially outward from the central portion of the compressor shaft 16. The first and second thrust bearings 38 and 40 are on opposite sides of the first thrust plate 42 to constrain movement of the compressor shaft 16 in an axial direction. The first and second thrust bearings 38 and 40 and the first thrust plate 42 are located between the first turbine and compressor wheels 26 and 30.

The first set of bearings further includes first and second journal bearings 44 and 46, located proximate and outboard the first turbine and compressor wheels 26 and 30. The first and second journal bearing 44 and 46 constrain the movement of the compressor shaft 16 in a radial direction.

The second set of bearings includes third and fourth thrust bearings 48 and 50. A second thrust plate 52 is located between the first ends of the compressor and fan shafts 16 and 22. The second thrust plate 52 extends radially outward from the fan shaft 22. The third and fourth thrust bearings 48 and 50 are on opposite sides of the second thrust plate 52 to constrain movement of the fan shaft 16 in an axial direction.

The second set of bearings further includes third and fourth journal bearings 54 and 56, which constrain the movement of the fan shaft 22 in a radial direction. The third journal bearing 54 is located between the second thrust plate 52 and the first end of the fan shaft 22.

The foil bearings 38, 40, 44, 46, 48, 50, 54 and 56 are supported by one or more of the following housings: the first turbine housing 24, the second turbine housing 32, the compressor housing 28 and the fan housing 37. For example, the FIGURE shows that the second and fourth journal bearings 46 and 56 are supported by the fan housing 37.

The air cycle machine 10 could be used in a variety of two spool environmental control systems. For instance, the air cycle machine 10 could be used in the two spool environmental control system described and claimed in U.S. Ser. No. 08/996,742 filed Dec. 23, 1997 ("Single Package Cascaded Turbine Environmental Control System") and assigned to the assignee of the present invention, U.S. Ser. No. 08/996,742 is incorporated herein by reference. The air cycle machine 10 could also be used in the two spool environmental control system described and claimed in U.S. Ser. No. 08/967,437 filed Nov. 11, 1997 ("Two Spool Environmental Control System") and also assigned to the assignee of the present invention. U.S. Ser. No. 08/967,437 is also incorporated herein by reference. Such environmental control systems include at least one heat exchanger for removing heat of compression in bleed air prior to expansion, water removal equipment for removing entrained water from the air, and ducting for directing the air between the heat exchangers, water removal equipment and air cycle machine 10. High pressure water separation could be performed upstream the high pressure turbine section 12, or mid-pressure water separation could be performed intermediate the two turbine sections 12 and 18, or low pressure water separation could be performed downstream the low pressure turbine section 18, etc. The cooled air leaving the environmental control system is supplied, directly or indirectly, to a compartment such as an aircraft cabin.

In cruise flight of an aircraft, it is possible that the fan rotor 36 might begin windmilling due to ram pressure drop across the air cycle machine 10. However, this problem can be overcome by designing the fan rotor 36 to operate and consume power at pressure ratios between 0.95 and 1.1.

Thus disclosed is a two-spool air cycle machine 10 that can be operated at greater efficiency than a four wheel machine. The air cycle machine 10 can be operated at greater efficiency because its fan section 20 can be operated at a speed consistent with maximum fan efficiency while its compressor section 14 can be operated at a speed consistent with maximum compressor efficiency.

The air cycle machine 10 according to the present invention can be packaged in a smaller envelope than an air cycle machine having two spools that are packaged separately. The air cycle machine 10 according to the present invention is also lighter than an air cycle machine having two spools that are packaged separately. The smaller size also creates flexibility in placing the air cycle machine 10 in aircraft bays of different sizes. Additionally, ducting for a system including the air cycle machine 10 according to the present invention is less complex.

The invention is not limited to the specific embodiment described above. The air cycle machine is not limited to a compressor section and a fan section. For example, the first spool could be a simple cycle machine having a first fan and a high pressure cooling turbine mounted to the one shaft; and the second spool could be a simple cycle machine having a second fan and a low pressure cooling turbine mounted to the other shaft. The first fan could be optimally sized for the first cooling turbine, and the second fan could be optimally sized for the second cooling turbine.

In the alternative, the first spool could be a bootstrap machine having a first compressor and a high pressure cooling turbine mounted to the one shaft; and the second spool could be bootstrap machine having a second compressor and a low pressure cooling turbine mounted to the other shaft. Each compressor would typically result in the addition of a secondary air-to-air heat exchanger to provide to provide additional cooling. Each compressor could be optimally sized for its co-mounted cooling turbine.

Axial turbines may be used instead of radial inflow turbines. However, the use of radial inflow turbine sections and a radial outflow compressor section are believed to further increase efficiency and reduce the envelope.

The invention is not limited to the bearing configuration described above. For instance, the compressor wheel could be supported by a single inboard journal bearing and a single outboard journal.

Accordingly, the invention is not limited to the specific embodiments above. Instead, the invention is construed according to the claims that follow.

We claim:

1. An air cycle machine for an aircraft environmental control system, the air cycle machine comprising:

first and second shafts concentrically arranged and independently rotatable with respect to one another;

a first cooling turbine section including a first turbine wheel, the first turbine wheel being secured to the first shaft;

a second cooling turbine section including a second turbine wheel, the second turbine wheel being secured to the second shaft, said second shaft having a first end that extends beyond a first end of said first shaft;

a second thrust plate located between the first ends of the first and second shafts, the thrust plate extending radially outward from the second shaft;

a first set of foil bearings for supporting the first shaft; and a second set of foil bearings for supporting the second shaft, said second set including a third and fourth thrust bearing on opposite sides of the second thrust plate.

2. The machine of claim 1, wherein the second set of foil bearings includes third and fourth journal bearings, the third journal bearing being located between the second thrust plate and the first end of the second shaft.

3. The machine of claim 1, further comprising third wheel secured to a central portion of the first shaft; and a first thrust plate extending radially outward from the central portion of the first shaft; the first turbine wheel also being secured to the central portion of the first shaft, wherein the first set of foil bearings includes first and second thrust bearings on opposite sides of the first thrust plate; the first and second thrust bearings and the first thrust plate being located between the first turbine wheel and the third wheel.

4. The machine of claim 3, wherein the first set of foil bearings includes first and second journal bearings located proximate and outboard the first turbine and third wheels.

5. The machine of claim 1, further comprising a compressor section including a compressor wheel; and a fan section including a fan rotor, the fan and the second turbine wheel being secured to opposite ends of the second shaft, the first turbine wheel and the compressor wheel being secured to a central portion of the first shaft.

6. The machine of claim 5, further comprising a first thrust plate secured to the central portion of the first shaft; the first thrust plate extending radially from the first shaft, the first set of foil bearings includes first and second thrust bearings on opposite sides of the first thrust plate, the first thrust plate and the first and second thrust bearings being located between the compressor and first turbine wheels; wherein the first set of foil bearings further includes first and second journal bearings located proximate and outboard the first turbine and compressor wheels; and wherein the second set of foil bearings includes a third journal bearing between the second thrust plate and the first end of the second shaft.

7. The machine of claim 5, wherein both turbine sections include radial inflow turbines; and wherein the compressor section includes a radial outflow compressor.

8. The machine of claim 5, wherein the first turbine section includes a housing, the second turbine section includes a housing, the compressor section includes a housing, and the fan section includes a housing; and wherein the first and second sets of foil bearings are supported by at least one of the housings.

9. An aircraft environmental control system operable to condition a stream of hot, compressed air, the system comprising:

at least one heat exchanger for removing heat of compression from the air;

water removal apparatus for removing water entrained in the air; and an air cycle machine for expanding the air, the air cycle machine having a first cooling turbine section including a first turbine wheel; a second cooling turbine section including a second turbine wheel; first and second shafts that are concentrically arranged and that are independently rotatable with respect to one another; and first and second sets of foil bearings for supporting the first and second shafts; the first turbine wheel being secured to the first shaft; the second turbine wheel being secured to the second shaft, the air cycle machine further includes a compressor section including a compressor wheel; and a fan section including a fan rotor, the fan rotor and the second turbine wheel being secured to opposite ends of the second shaft, the first turbine wheel and the compressor wheel being secured to a central portion of the first shaft, both the fan rotor and the compressor wheel being sized for peak operating efficiency, wherein the first turbine section includes a housing, the second turbine section includes a housing, the compressor section includes a housing, and the fan section includes a housing; and wherein the first and second sets of foil bearings are supported by at least one of the housings.

10. The system of claim 9, wherein the fan rotor is capable of consuming power at pressure ratios between 0.95 and 1.1.

11. The system of claim 9, wherein both turbine sections include radial inflow turbines; and wherein the compressor section includes a radial outflow compressor.

12. The system of claim 9, further comprising a first thrust plate secured to the central portion of the first shaft; and a second thrust plate secured to the second shaft, the first thrust plate extending radially from the first shaft, the second thrust plate extending radially from the second shaft, the second thrust plate being located between first ends of the first and second shafts; wherein the first set of foil bearings includes first and second thrust bearings on opposite sides of the first thrust plate, the first thrust plate and the first and second thrust bearings being located between the compressor and first turbine wheels; and wherein the second set of foil bearings includes third and fourth thrust bearings on opposite sides of the second thrust plate.

13. The system of claim 12, wherein the first set of foil bearings further includes first and second journal bearing located proximate and outboard the first turbine and compressor wheels; and wherein the second set of foil bearings includes a third journal bearing between the second thrust plate and the first end of the second shaft.

* * * * *